United States Patent [19]

van der Meer

[11] Patent Number: 4,822,837

[45] Date of Patent: Apr. 18, 1989

[54] POLYMER MIXTURE COMPRISING A POLYPHENYLENE ETHER AND A POLYAMIDE

[75] Inventor: Roelof van der Meer, Bergen op Zoom, Netherlands

[73] Assignee: General Electric Company, Albany, N.Y.

[21] Appl. No.: 916,347

[22] Filed: Oct. 6, 1986

Related U.S. Application Data

[62] Division of Ser. No. 739,401, May 30, 1985, Pat. No. 4,659,760.

[51] Int. Cl.$^4$ ............... C08K 5/51; C08K 5/52; C08K 91/06
[52] U.S. Cl. ................... 524/153; 524/141; 524/279; 524/505; 524/508; 524/514; 525/68; 525/92; 525/905
[58] Field of Search ............ 524/279, 141, 153; 525/905

[56] References Cited

U.S. PATENT DOCUMENTS

| | | | |
|---|---|---|---|
| 3,379,792 | 4/1968 | Finholt | 525/397 |
| 3,692,867 | 7/1975 | Mayer et al. | 524/538 |
| 3,822,227 | 7/1974 | Hermann et al. | 524/279 |
| 3,959,211 | 5/1976 | Cooper et al. | 525/905 |
| 4,315,086 | 2/1982 | Ueno . | |
| 4,338,421 | 7/1982 | Marayuma . | |
| 4,600,741 | 7/1986 | Aycork | 524/139 |

*Primary Examiner*—Jacob Ziegler
*Attorney, Agent, or Firm*—Francis T. Coppa

[57] ABSTRACT

The mechanical properties of polyphenylene ether - polyamide mixtures are improved by the addition of an oxidized polyolefin wax. In addition, a phosphite is preferably added.

8 Claims, No Drawings

POLYMER MIXTURE COMPRISING A POLYPHENYLENE ETHER AND A POLYAMIDE

This is a division of application Ser. No. 739,401 filed May 30, 1985, now U.S. Pat. No. 4,659,760.

The invention relates to a polymer mixture comprising a polyphenylene ether and a polyamide.

Polymer mixtures comprising a polyphenylene ether and a polyamide are disclosed in U.S. Pat. No. 3,379,792. According to European patent application No. 24 120, in order to further improve the mechanical properties of polyphenylene ether-polyamide mixtures, various types of compounds may be added. One type consists of compounds which in their molecule comprise a double or triple unsaturated bond and a carboxylic acid, acid anhydride, acid amide, imido, carboxylic acid ester, amino or hydroxyl group.

European Patent Specification No. 24 120 furthermore mentions liquid diene polymers and epoxy compounds as compounds which are suitable to improve the mechanical properties of polyphenylene ether-polyamide mixtures.

The present invention is based on the discovery that other compounds are also suitable to improve the mechanical properties of polyphenylene ether-polyamide mixtures.

The polymer mixture according to the invention is characterized in that it comprises the following constituents:
(a) 1–99% by weight of polyphenylene ether
(b) 99–1% by weight of polyamide
(c) 0.01–10% by weight of an oxidized polyolefin wax, and
(d) 0–100% by weight of the possible reaction products of a and b, of a and c, of b and c or of a, b and c, and in which the quantities are calculated with respect to the sum of a and b.

Polymer mixtures comprising a polyamide and a polyolefine to which an oxidized wax has been added have been described in U.S. Pat. No. 3,822,227. Polyolefines however are chemically completely different as compared to the polyphenylene ethers as used in the polymer mixtures according to the present invention.

The polymer mixture according to the invention preferably comprises 0.01–5% by weight, even more preferably 0.05–2% by weight of oxidized polyethylene wax.

A further improvement of the properties of polyphenylene ether-polyamide mixtures is obtained when the polymer mixture comprises, in addition to the oxidized polyolefin, a phosphite, for example, an alkyl phosphite, an aryl phosphite or an alkyl-aryl phosphite or a mixture of such phosphites. The phosphite is used in a quantity from 0.01 to 10% by weight, preferably from 0.1 to 5% by weight, even more preferably from 0.1 to 2.5% by weight.

The manner in which the oxidized polyolefin wax or the combination of the oxidized polyolefin wax and the phosphite improves the mechanical properties of polyphenylene ether-polyamide mixtures is not clear. It is well feasible that a reaction occurs between one or more of the constituents present in the polymer mixture; this may be a grafting reaction. Feasible is a grafting reaction between the polyphenylene ether and the polyamide, in which the oxidized polyolefin wax and the optionally present phosphite are active as a coupling agent.

The polymer mixture according to the invention comprises 1–99% by weight, preferably 10–90% by weight of a polyphenylene ether. This type of compounds is sometimes referred to as polyphenylene oxide.

Polyphenylene ethers are compounds known per se. For this purpose, reference may be made to the U.S. Pat. Nos. 3,306,874; 3,306,875; 3,257,357 and 3,257,358. Polyphenylene ethers are usually prepared by an oxidative coupling reaction—in the presence of a copper amine complex—of one or more double or triple substituted phenols, in which homopolymers and copolymers, respectively, are obtained. Copper amine complexes derived from primary, secondary and/or tertiary amines may be used. Examples of suitable polyphenylene ethers are:

poly(2,3-dimethyl-6-ethylphenylene-1,4-ether)
poly(2,3,6-trimethylphenylene-1,4-ether)
poly(2,4'-methylphenylphenylene-1,4-ether)
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2-chloro-6-bromophenylene-1,4-ether)
poly(2,6-di-n-propylphenylene-1,4-ether)
poly(2-methyl-6-isopropylphenylene-1,4-ether)
poly(2-chloro-6-methylphenylene-1,4-ether)
poly(2-methyl-6-ethylphenylene-1,4-ether)
poly(2,6-dibromophenylene-1,4-ether)
poly(2,6-dichlorophenylene-1,4-ether)
poly(2,6-diethylphenylene-1,4-ether)
poly(2,6-dimethylphenylene-1,4-ether)

Copolymers, for example, copolymers derived from two or more phenols as used in the preparation of the above-mentioned homopolymers, are also suitable. Furthermore, graft copolymers and block copolymers of vinylaromatic compounds, such as polystyrene and of polyphenylene ether as described above, are suitable.

The polymer mixture according to the invention comprises 99–1% by weight, preferably 90–10% by weight of polyamide. All the known thermoplastic polyamides may be used in the polymer mixtures according to the invention. Suitable polyamides are, for example, polyamide-4, polyamide-6, polyamide-4,6, polyamide-6,6, polyamide-3,4, polyamide-12, polyamide-11, polyamide-6,10, polyamides prepared from terephtalic acid and 4,4'-diaminodicyclohexyl methane, polyamides prepared from azelaic acid, adipic acid and 2,2-bis-(p-aminocyclohexyl) propane, polyamides prepared from adipic acid and metaxylylene-diamine, polyamides from terephtalic acid and trimethyl hexamethylene diamine.

The polymer mixture according to the invention comprises in addition 0.01–10% by weight, preferably 0.01–5% by weight, even more preferably 0.5–2% by weight, of an oxidized polyolefin wax. Oxidized polyolefin wax types are known per se. A description of suitable oxidized polyolefin waxes is to be found in German patent application Nos. 2035706, 3047915 and 2201862. Suitable oxidized polyolefin waxes are commercially available by the name of "Hoechst Wachs". These oxidized types of polyolefin wax are generally prepared by air oxidation or suspension oxidation of a polyolefin.

As indicated above, the polymer mixture according to the invention may comprise an organic phosphite. If used, the phosphite is used in a quantity of 0.01-10% by weight, preferably 0.1-5% by weight, even more preferably 0.1-2.5% by weight. Examples of suitable phosphites are triphenyl phosphite, trimesityl phosphite, dimesitylphenyl phosphite, trineopentyl phosphite, didecylphenyl phosphite, dichloroethyl phosphite, tributyl phosphite, trilauryl phosphite, tris(nonylphenyl) phosphite, tri-decylphosphite, diphenyldecyl phosphite or a mixture of one or more of these phosphites.

As in the known polymer mixtures, the polymer mixture according to the invention may comprise one or more compounds to improve the impact strength. The polymer mixtures according to the invention may comprise any means which are suitable for polyphenylene ether or for polyamides and which improve the impact strength. Suitable means to improve the impact strength are, for example, polybutadiene, ethylenepropylenediene rubbers, hydrogenated or non-hydrogenated thermoplastic rubbers. These agents are usually used in a quantity of not more than 40% by weight, preferably not more than 20% by weight, calculated with respect to the sum of the quantity of the polyphenylene ether and the polyamide.

Particularly suitable agents to improve the impact strength of the polymer mixtures according to the invention are the so-called block copolymers havings blocks derived from a diene such as polybutadiene blocks and having blocks derived from a vinylaromatic compound such as polystyrene blocks. These block copolymers may be of different types, for example of the AB, ABA, A(B)4 type. Said block copolymers may be hydrogenated.

A mixture of two or more of the above-mentioned block copolymers is preferably used.

A polymer or a copolymer of a vinylaromatic compound may be added to the polymer mixture according to the invention. Examples of such polymers are polystyrene and high impact polystyrene. These compounds are added in a quantity of at most 100% by weight calculated with respect to the quantity of polyphenylene ether plus polyamide.

In addition to the above-mentioned constituents the polymer mixtures according to the invention may comprise any additives such as organic and inorganic stabilizers, flame-retarding agents, fillers, reinforcing fillers, for example, glass fibres and carbon fibres, dyes and pigments, additives to make the polymer mixtures antistatic or conductive, etc.

The invention will now be described with reference to the ensuing specific examples.

EXAMPLES I AND II; A, B and C

Five polymer mixtures were prepared: the polymer mixtures I and II according to the invention and the polymer mixtures A, B and C for comparison. All the polymer mixtures were prepared by mixing in a Werner Pfleiderer double-blade extrusion machine at a speed of 300 r.p.m., temperature adjusted at 285° C. Starting material was 45 parts by weight of poly (2,6-dimethyl-phenylene-1,4-ether) (polyphenylene ether) having an intrinsic viscosity of approximately 48 ml/g measured at 25° C. in chloroform and 45 parts by weight of polyamide-6,6 having a number of averaged molecular weight, Mn, of 20,000 and a viscosity index measured according to ISO R 307 (0.5 g of polyamide dissolved in 90% formic acid at 25° C.) of 135 ml/g. The moisture content of the polyamide is approximately 0.1%.

A hydrogenated styrene-butadiene-styrene block copolymer was added to the polymer mixture. As a block copolymer I was used a hydrogenated styrene-butadiene-styrene triblock copolymer with a ratio of polystyrene to polybutadiene of 27 to 73 and with an Mn of 74,000 (Example A). As a block copolymer II was used a hydrogenated styrene-butadiene-styrene triblock copolymer with a ratio of polystyrene to polybutadiene of 33 to 67 and an Mn of approximately 160,000 (Example B, Example I). In Examples II and C a mixture of the two block copolymers just mentioned was used. The overall quantity of block copolymer was always 10 parts by weight.

In the Examples I and II according to the invention always 1 part by weight of an oxidized polyethylene wax (Hoechst Wachs PED 136) was added; in the Examples A, B and C no oxidized polyethylene wax was added. Hoechst Wachs PED 136 is an oxidized polyethylene wax having a drop point of 107°-112° C. (DIN 51801), an acid number of 60-64 (DIN 53402) and a saponification number of 90-115 (DIN 53401).

From the resulting polymer mixtures, test bars were manufactured by injection moulding according to ASTM D 638 to determine the tensile strength and the elongation at rupture. Test bars were also moulded according to ASTM D 256 to measure the impact strength according to Izod (with notch). Moreover, a disk was moulded having a thickness of 3.2 mm and a diameter of 100 mm. A normalized test body having a hemispherical tip and a weight of 100N was dropped on said disk from a height of 2.2 m. The absorbed energy was measured. The energy value thus found is indicated as "falling dart impact" (DIN 53443).

The measured results and the composition of the various polymer mixtures are recorded in Table A hereinafter. It appears from a comparison of Example I with Example B on the one hand and of Example II with Example C on the other hand that the addition of 1 part by weight of oxidized polyethylene wax results in a great improvement of the mechanical properties, in particular of the Izod impact strength, the falling dart impact value and the elongation at rupture.

TABLE A

|  | Example | | | | |
| --- | --- | --- | --- | --- | --- |
|  | A | B | C | I* | II* |
| Composition (parts by weight) | | | | | |
| polyphenylene-ether | 45 | 45 | 45 | 45 | 45 |
| polyamide-6,6 | 45 | 45 | 45 | 45 | 45 |
| hydrogenated triblock copolymer I | 10 | — | 5 | — | 5 |
| hydrogenated triblock copolymer II | — | 10 | 5 | 10 | 5 |
| Hoechst Wachs PED 136 | — | — | — | 1 | 1 |
| Properties | | | | | |
| Izod notch impact value (J/m) | 52.5 | 40 | 55 | 245 | 217.5 |
| Falling dart impact (J) | 9 | 10 | 6 | 210 | 130 |
| Tensile strength at rupture (MPa) | 46.2 | 52.6 | 52.8 | 53.9 | 51.7 |
| Elongation at rupture (%) | 12.3 | 7.1 | 8.7 | 42.5 | 21 |

*according to the invention

EXAMPLES III AND IV

In a manner similar to that of Examples I and II (extrusion temperature: 295° C.), polymer mixtures were prepared consisting of 49 parts by weight of poly (2,6-dimethylphenylene-1,4-ether), 41 parts by weight of polyamide-6,6 (having a moisture content of approximately 0.35%), 10 parts by weight of an unsaturated styrene-butadiene-styrene triblock copolymer and 1 part by weight of organic phosphite. The triblock copolymer used comprises 28% styrene and 72% of polybutadiene. Mn is equal to 80,000.

The mechanical properties of the polymer mixtures according to Examples III and IV were determined in the above-described manner. The results are recorded in Table B below.

TABLE B

|  | Example III* | Example IV* |
|---|---|---|
| Composition (parts by weight) | | |
| polyphenylene ether | 49 | 49 |
| polyamide-6,6 | 41 | 41 |
| unsaturated styrene-butadiene-styrene triblock copolymer | 10 | 10 |
| Hoechst Wachs PED 136 | 1 | 1 |
| triphenyl phosphite | 1 | — |
| organic phosphite** | — | 1 |
| Properties | | |
| Izod notch impact value (J/m) | 192.5 | 207.5 |
| Falling dart impact (J) | 115 | 143 |
| Tensile strength at rupture (MPa) | 63.2 | 60 |
| Elongation at rupture (%) | 29 | 28 |

*polymer mixture according to the invention
**a mixture of tris(nonylphenyl)phosphite and decyl phenyl phosphites.

EXAMPLES D, V, VI, VII, VIII, IX en X

The polymer mixtures recorded in Table C hereinafter were prepared in a manner similar to that described above (extrusion temperature: 285° C., 200 r.p.m.). The mechanical properties of the polymer mixtures were determined. The values found are recorded in Table C. In Example X according to the invention Hoechst Wachs PED 153 was used having a drop point of 118°-123° C. (DIN 51801), an acid number of 25-28 (DIN 53402) and a saponification number of 30-50 (DIN 53401).

TABLE C

|  | Example D | V* | VI* | VII* | VIII* | IX* | X* |
|---|---|---|---|---|---|---|---|
| Composition (parts by weight) | | | | | | | |
| polyphenylene ether | 50 | 50 | 50 | 50 | 50 | 50 | 50 |
| polyamide-6,6** | 50 | 50 | — | 50 | 50 | 50 | 50 |
| polyamide-6,6*** | — | — | 50 | — | — | — | — |
| Hoechst Wachs PED 136 | — | 1 | 1 | 0.75 | 0.5 | 0.75 | — |
| Hoechst Wachs PED 153 | — | — | — | — | — | — | 1 |
| organic phosphite**** | — | 1 | 1 | 1 | 1 | 1.5 | 1 |
| Properties | | | | | | | |
| Izod notch impact value (J/m) | 29 | 70 | 62 | 64 | 44 | 51 | 57 |
| Tensile strength at rupture (MPa) | 75.0 | 75.8 | 73.6 | 80.1 | 75.0 | 77.4 | 73.0 |
| Elongation at rupture (%) | 7.1 | 19.2 | 6.9 | 10.4 | 6.9 | 14.6 | 8.0 |

*according to the invention
**with less than 0.1% H$_2$O
***with approximately 0.35% H$_2$O
****the same mixture as in example IV

EXAMPLE E, EXAMPLES XI T/M XVII

In a manner similar to that of Example I (extrusion temperature: 285° C., 200 r.p.m.) various polymer mixtures were prepared. The mixtures according to the Examples XI to XVII are according to the invention. Example E is for comparison. In these examples various oxidized polyolefins were used in various concentrations, namely Hoechst Wachs PED 136 and Hoechst Wachs PED 153 as defined hereinbefore and Hoechst Wachs PED 534. Hoechst Wachs PED 534 is a polyethylene wax having a drop point of 98°-105° C. (DIN 51801), an acid number of 35-40 (DIN 53402) and a saponification number of 40-60 (DIN 53401).

The composition of the polymer mixtures and their properties are recorded in Table D hereinafter.

TABLE D

|  | Example E | XI* | XII* | XIII* | XIV* | XV* | XVI* | XVII* |
|---|---|---|---|---|---|---|---|---|
| Composition (parts by weight) | | | | | | | | |
| polyphenylene ether | 50 | 50 | 50 | 50 | 50 | 50 | 50 | 50 |
| polyamide-6,6** | — | — | 50 | 50 | 50 | 50 | 50 | 50 |
| polyamide-6,6*** | 50 | 50 | — | — | — | — | — | — |
| Hoechst Wachs PED 136 | — | 1 | 1 | 0.75 | 1.5 | 3 | — | — |
| Hoechst Wachs PED 534 | — | — | — | — | — | — | 1 | — |
| Hoechst Wachs PED 153 | — | — | — | — | — | — | — | 1 |
| Properties | | | | | | | | |
| Izod notch impact value (J/m) | 37 | 45 | 48 | 47 | 48 | 13 | 51 | 51 |
| Tensile strength at rupture (MPa) | 53.9 | 56.6 | 66.6 | 65.6 | 66.2 | 40.3 | 63.2 | 66.0 |
| Elongation at rupture (%) | 5.5 | 7.0 | 10.5 | 8.6 | 9.7 | 4.3 | 8.8 | 10.4 |

*according to the invention
**moisture content smaller than 0.1%
***moisture content approximately 0.35%

It may be seen from the Table (Example XV) that a comparatively large quantity of Hoechst Wachs may lead to a reduction of the Izod notch impact value.

It appeared in practice that the found results depend upon the adjustments of the extrusion.

I claim:

1. A polymer mixture comprising the following constituents:

(a) 1 to 99% by weight of a polyphenylene ether,
(b) 99 to 1% by weight of a polaymide, and
(c) 0.01 to 10% by weight based upon the weight of (a) and (b) together of an oxidized polyolefin wax.

2. A polymer mixture as in claim 1 wherein said oxidized polyethylene wax is present in an amount of 0.05 to 2% by weight based upon the weight of (a) and (b) together.

3. A polymer mixture as in claim 1 further comprising:
(d) 0.01 to 10% by weight based upon the weight of (a) and (b) of a phosphite compound selected from the group consisting of alkyl phosphite, aryl phosphite and alkyl-aryl phosphite.

4. A polymer mixture as in claim 1 further comprising at least one impact strength improving agent in a quantity of at most 40% by weight based upon the weight of (a) and (b).

5. A polymer mixture as in claim 4 wherein said impact strength improving agent is selected from the group consisting of hydrogenated styrene-butadiene diblock and triblock copolymers.

6. A polymer mixture as in claim 4 wherein said impact strength improving agent is selected from the group consisting of non-hydrogenated styrene-butadiene diblock and triblock copolymers.

7. A polymer mixture as in claim 1 further comprising a styrene polymer in an amount up to 100% by weight calculated with respect to the sum of components (a) and (b).

8. A polymer mixture as in claim 1 further comprising a filler selected from the group consisting of carbon fibers and glass fibers.

* * * * *